Nov. 14, 1961    M. J. TAUSCHEK ET AL    3,008,687
VALVE SPRING RETAINER AND LOCK
Filed May 15, 1958    2 Sheets-Sheet 1
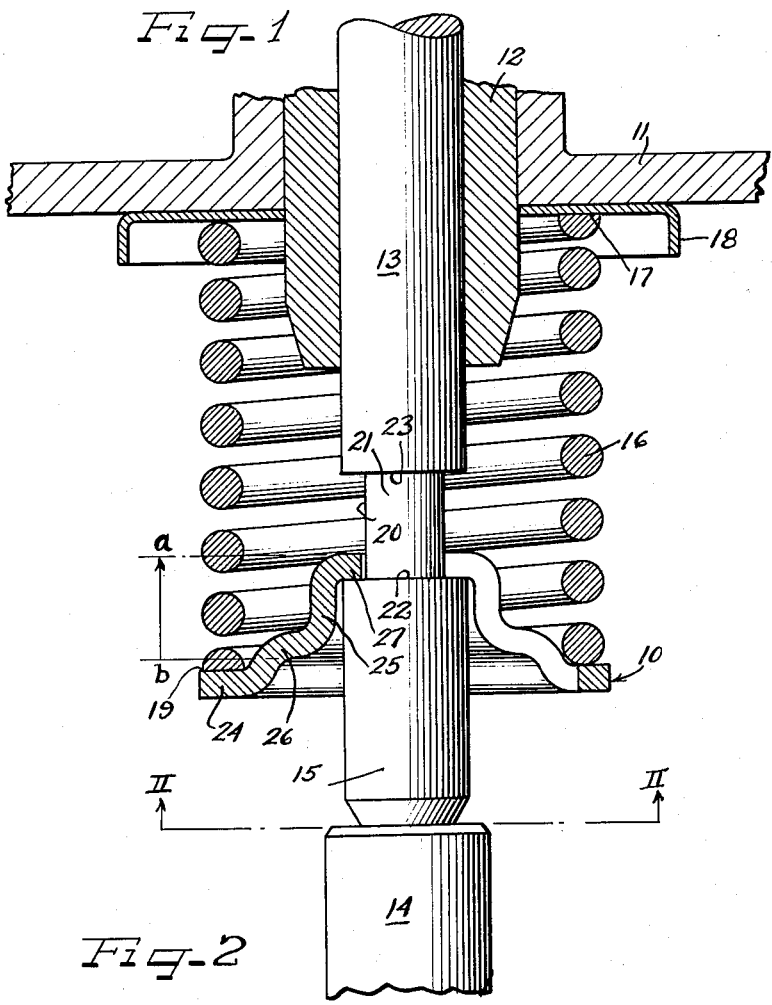
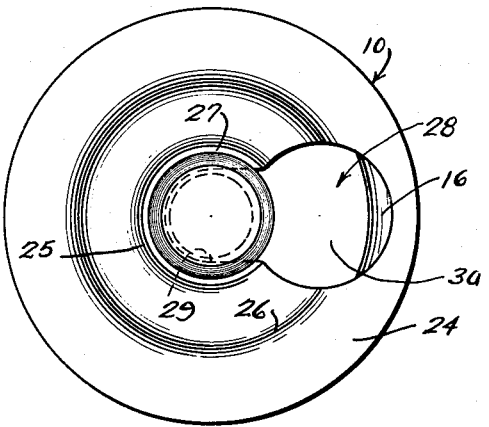
Inventors
Max J. Tauschek
Donald J. Seiler Nov. 14, 1961   M. J. TAUSCHEK ET AL   3,008,687
VALVE SPRING RETAINER AND LOCK
Filed May 15, 1958   2 Sheets-Sheet 2
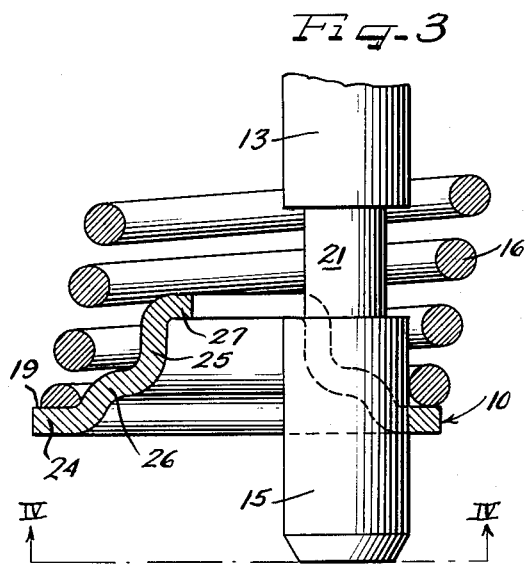
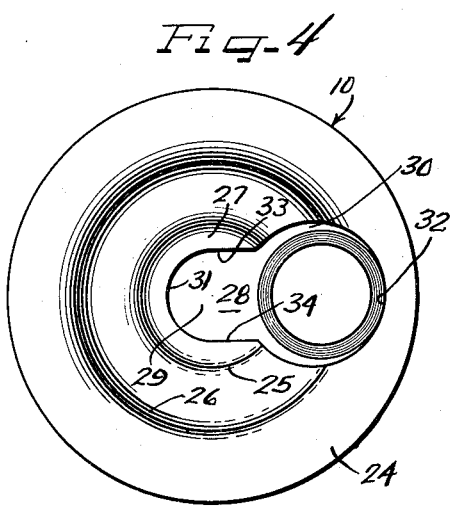
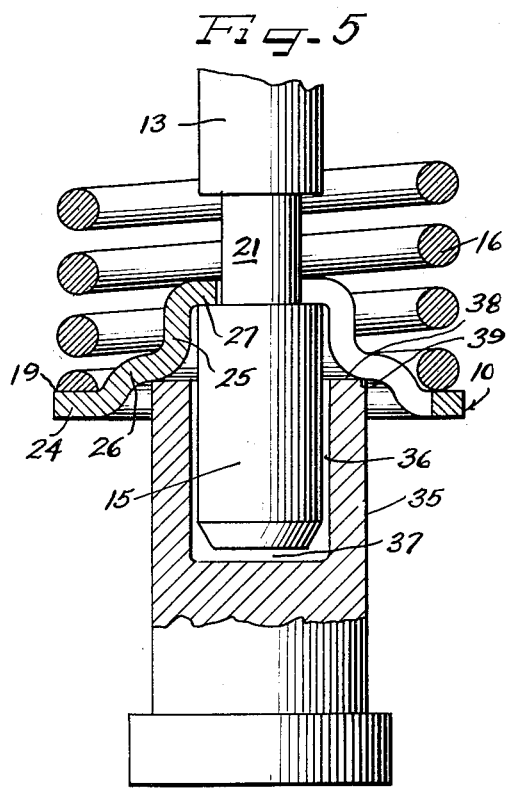
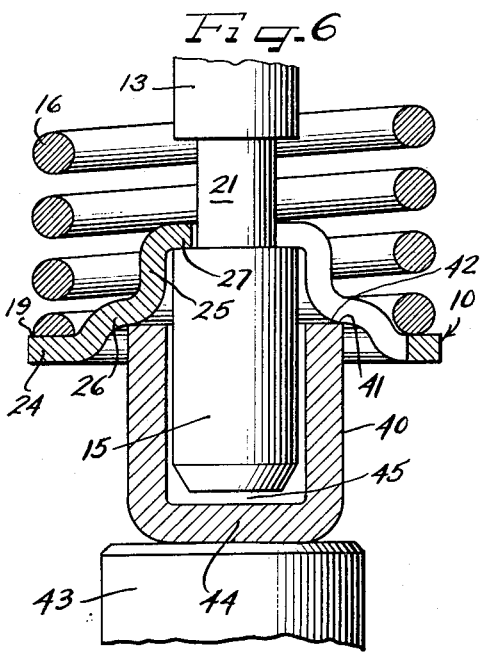
Inventors
Max J. Tauschek
Donald J. Seiler … # 3,008,687
VALVE SPRING RETAINER AND LOCK
Max J. Tauschek, Lyndhurst, and Donald J. Seiler, Akron, Ohio, assignors to Thompson Ramo Wooldridge Inc., a corporation of Ohio
Filed May 15, 1958, Ser. No. 735,493
2 Claims. (Cl. 251—337)

The present invention relates broadly to improvements in valve return spring retaining means, and is more particularly concerned with a novel device of unitary construction which may be rapidly and accurately installed and locked upon the valve stem in bottoming relation to the return spring thereon.

In relatively small utility engines a problem has particularly arisen in the location of conventional type valve spring retainers upon the valve stem. To explain, one form of retainer currently in active employment comprises an apertured disc which is moved upon the valve stem in bottoming relation to the return spring and cross-pins inserted in holes in the valve stem to fix the axial position of the spring retainer with relation to the stem. Recently however, in the design of the engine a small covered compartment for the valve stem and spring has been provided, and in such an arrangement it is relatively impossible to obtain sufficient access in an axial direction to permit insertion of the conventional cross-pins or like devices.

It is therefore an important aim of the present invention to provide a valve spring retainer and lock of relatively simple construction and which may be readily installed and removed under minimum clearance conditions.

Another object of the invention lies in the provision of a valve spring retainer which does not require the use of pins or the like to lock the same upon the valve stem, and which is formed with portions bearing against the valve stem to limit axial movement of the retainer.

Another object of this invention is to provide a cap member adapted to be laterally displaced into a firmly locked position upon the valve stem and cooperating with a groove formed thereon.

A further object of the present invention is to provide a novel combination of parts comprising a laterally lockable retainer cap and means receiving the tip end of the valve stem and bearing against the retaining cap to release the same from the valve stem to provide rotation of the valve during cyclic operation thereof.

A still further object of the invention lies in the provision of a retainer member formed with a variable diameter slot therein whereby the retainer may be first moved axially along the valve stem and thereafter directed laterally to be locked in a firm spring bottoming position upon the valve stem.

Other objects and advantages of the invention will become more apparent during the course of the following description, particularly when taken in connection with the accompanying drawings.

In the drawings, wherein like numerals are employed to designate like parts throughout the same:

FIGURE 1 is a fragmentary view showing the valve spring retainer and lock means according to the principles of the present invention applied to a poppet valve assembly of an internal combustion engine and with parts broken away and with parts shown in cross-section to illustrate the positioning of the components when the valve is in closed position during the cyclic operation thereof;

FIGURE 2 is a vertical sectional view taken substantially along the line II—II of FIGURE 1;

FIGURE 3 is a side elevational view, with parts in section, to illustrate the positioning of the retainer member during location upon the valve stem;

FIGURE 4 is a vertical sectional view taken substantially along the line IV—IV of FIGURE 3;

FIGURE 5 is a side elevational view, with parts in section, illustrating the retainer member of this invention in association with a novel tappet construction;

FIGURE 6 is a side elevational view, with parts in section, showing a further modification of the invention.

Briefly stated, the spring retainer and lock means therefor of this invention comprises a generally dome-shaped member having a keyhole slot formed therein. The relatively wider portion of the slot is sized to receive a poppet valve stem during axial movement of the retainer upon installation thereof, while the relatively narrower portion of the keyhole slot is sized to closely surround a groove formed in the valve stem to lock the retainer thereon after installation. The retainer member is shaped to include a radially outwardly extending flange or rim portion providing a bottoming surface for the valve return spring, and a radially inwardly turned portion to seat against the valve stem in the groove thereof and press thereagainst by action of the return spring. A recessed tappet or tip cup of novel construction is provided for location in surrounding relation to the stem tip end in contact with the retainer member to effect release thereof and rotation of the valve during movement to an open position. Further structural features of the present invention will be brought out in the description to follow.

Referring now to the drawings, and particularly first to FIGURE 1 thereof, a retainer member constructed in accordance with the principles of this invention is designated therein generally by the numeral 10, and is shown in association with a poppet valve assembly of the character generally employed in internal combustion engines. The assembly includes an engine part 11 mounting a valve stem guide 12 supporting a valve stem 13 for axial movement therein upon actuation by a tappet 14 engageable with the tip end 15 of the valve stem.

A return spring 16 is bottomed at one end as indicated at 17 against a cup member 18 abutting the engine part 11, while the opposite end of the return spring 16 is bottomed at 19 against the retainer member 10 of this invention.

Inwardly of the tip end 15 thereof the valve stem 13 is grooved at 20 to provide a reduced diameter stem portion 21 and essentially straight or flat end walls 22 and 23 axially outwardly of said reduced diameter portion. The groove 20 is of predetermined length, as will be noted in detail later, relative to a portion of the height of the retainer 10 to facilitate the positioning of the same with respect to a valve stem 13.

The spring retainer 10 is characterized as to shape by a radially outwardly extending base flange or rim portion 24 bottoming the spring 16 and connecting with a substantially cylindrical neck portion 25 by means of a curved or arc-shaped portion 26. Normally in pressing contact with the wall 22 of the groove 20 is a radially inwardly turned lip portion 27. It may be noted that the base flange or rim 24 lies generally parallel to the lip portion 26 of the retainer 10.

Formed in the retainer member 10 is a keyhole slot indicated generally at 28 and comprising a relatively small diameter center portion 29 opening into a relatively larger diameter portion 30 extending radially outwardly from said center portion 29. It maybe noted that the slot 28 is formed in a manner to provide generally rounded opposite end surfaces 31 and 32 and that the relatively smaller diameter portion 29 of the slot is shaped with generally parallel side surfaces 33 and 34. The length of the slot 28 measured radially between the end surfaces 31 and 32, as well as the diameter thereof in either of the portions 29 and 30, is determined by the diameter of the valve stem 15 and the reduced diameter portion 21 thereof. A certain amount of clearance is provided to facilitate installation of the retainer member 10 upon the valve stem; however, the radial center of the relatively smaller diameter portion 29 of the slot 28 is essentially along the axis of the reduced diameter portion 21 of the stem 15 and the radial center of the larger diameter portion 30 of the slot 28 is along the axis of the valve stem 15 itself, during positioning of the retainer member 10 upon the valve stem 15 in the manner now to be described.

In order to install the retainer member 10 upon the valve stem 15 with ease and speed, it has been found well to maintain a close relationship between the length of the groove 20 on the valve stem and the depth of the retainer member measured between the outer face of the lipped portion 27 and opposite outer face of the juncture of the cylindrical portion 25 and arc-shaped portion 26 of said retainer. These points are designated at $a$ and $b$ in FIGURE 1. While slight variations can of course be tolerated, it has been found that the groove length must be at least as long as the retainer cap depth measured between the points $a$ and $b$.

The installation of the retainer member 10 in the position of FIGURES 1 and 2 may be understood with greater clarity by making additional reference to FIGURES 3 and 4. With the return spring 16 removed from the valve stem 15, the retainer member 10 is located loosely upon one end of said spring 16 and the spring and retainer moved axially over the stem tip 15 so that said tip enters the relatively larger diameter portion 30 of the slot 28 in the manner of FIGURES 3 and 4.

The spring 16 is thereupon compressed, and with the relatively smaller diameter portion 29 of the slot 28 generally horizontally aligned with groove 20 on the stem 13, the retainer member 10 is moved or shifted laterally to locate the reduced diameter portion 21 of the stem 13 in said relatively smaller diameter portion 29 of the slot 28. The return spring 16 is thereupon released causing the side surfaces 33 and 34 of the slot portion 29 to contact or abut the relatively straight end wall 22 of the stem slot or groove 20. Stated otherwise, since the return spring 16 is preloaded when located in the position of FIGURE 1, said spring exerts an axial force against the rim portion 24 of the retainer 10 to lock said retainer in position by reason of contact between the radially inwardly turned lip portion 27 against the wall 22 of the stem groove 20.

It may be seen from the foregoing description of the installation of the retainer member that if the groove length was not at least as long as the distance between the points $a$ and $b$ on the retainer member, lateral shifting from the larger diameter portion 30 of the slot 28 to the smaller diameter portion 29 would be difficult to accomplish. In fact, if the groove length was substantially less than the distance between these two points, complete lateral shifting could not take place since the smaller diameter slot portion 29 would then be aligned with the stem 15, which has a diameter greater than that of the slot portion 29.

Essentially no axial movement of the retainer member occurs with respect to the valve stem 13 during opening and closing of the poppet valve, and lateral displacement of the member 10 beyond a minimum amount is precluded by contact between the cylindrical portion 25 of the member 10 and the valve stem tip end 15 limiting the extent of said lateral movement. The retainer member 10 is accordingly essentially stationary with respect to the valve stem 13 during cyclic operation of the valve or under conditions of vibration of the engine.

The construction of FIGURE 1, utilizing a flush or flat head tappet 14, is further characterized by essentially no rotation during cyclic operation or vibration. Rotation of the valve with the associated advantage of longer valve life is a feature, however, of the structure shown in FIGURES 5 and 6. The valve stem 13, return spring 16 and retainer member 10 are identical in construction to the foregoing described arrangement, and accordingly like numerals have been appended to these parts of FIGURES 5 and 6.

To accomplish rotation there is provided in FIGURE 5 a tappet 35 having a substantially cylindrical recess or cavity 36 formed in one end thereof. The cavity 36 is sized to be of a diameter slightly larger than the diameter of the valve stem tip end 15, and of a depth calculated to provide a clearance space 37 accommodating axial travel of the tappet 35 to release the retainer member 10 from a locked position upon the valve stem 13. Pressing contact is made between the tappet and retainer member 10 along marginal end portions 38 of the tappet and the outer surface 39 at the juncture between the cylindrical portion 25 and arc-shaped portion 26 of the retainer 10. When an opening load is applied by the tappet 35, an axial force is directed by the marginal end portions 38 of the tappet against the surface 39 of the retainer to release said retainer from a locked position upon the valve stem 13 and cause a minor amount of axial movement of said retainer. The valve stem is thereupon freed for rotation under the influence of the return spring 16 and inherent vibration in the engine.

As an alternative embodiment of the invention, there may be provided a cup member 40 of the character shown in FIGURE 6. The cup member 40 is bottomed at its marginal end portions 41 against the outward surface 42 of the retainer member 10, and a tappet 43 of conventional construction bears against the cup member 40 along the closed end 44 thereof. The cup member 40 is sized with an inner diameter slightly greater than the diameter of the tip end 15 of the valve stem, and a clearance space 45 is provided for the purpose earlier described in connection with the arrangement of FIGURE 5. The operation of the cup member 40 during opening of the valve is essentially the same as the recessed head tappet 35 of FIGURE 5, and accordingly its operation will not be specifically described.

It may be seen from the foregoing that applicants have provided a novel valve return spring retainer and lock therefor possessed of substantial advantages over the prior art constructions. The device may be readily installed in engines characterized by openings limited in axial dimensions, since it is no longer required that the retainer be locked in position on the valve stem by means of cross-pins and similar means. The retainer member may be rapidly located in position without the use of the tools formerly required, and this may be accomplished by semi-skilled workmen. A device constructed in accordance with the principles of this invention may be relatively inexpensively formed by stamping operations and the keyhole slot formed therein by punching techniques while the retainer cap is being shaped. When employed in association with a recessed tappet or cup member as illustrated in FIGURES 5 and 6, the retainer member provides for valve rotation at a cost substantially less than the positive rotating devices known to those skilled in the art.

It is to be understood that the forms of the invention herein shown and described are to be taken as the preferred embodiments of the same, and that various changes may be made in the size, shape and arrangement of parts without departing from the spirit of the invention or the scope of the subjoined claims.

We claim as our invention:

1. A valve stem, retainer and lock comprising a valve stem having a recessed portion of reduced section to form a shoulder disposed on a radial plane inwardly of the end of the stem, and a retainer comprising a sheet form member of uniform thickness shaped to form an outer annular peripheral flange disposed on a radial plane and having a spring seating surface on one side thereof, said retainer including neck portions extending radially and axially inwardly of said flange and terminating in an inner annular flange disposed on a radial plane and having a center opening large enough to receive said reduced section of said recessed portion, but small enough to form an abutment surface engaging said radial shoulder, said center opening having a side extension, the width and axial extent of said side extension in the region of said neck portions being such that said recessed portion of said stem will be received therethrough during assembly and will be locked in assembly with said retainer against lateral shifting after said shoulder is in engagement with said abutment surface in assembled position, said side extension opening further outwardly and axially into said neck portions to form an enlarged opening inwardly of said outer annular flange and being sized to freely receive said valve stem, said retainer abutment surface being movable axially beyond said stem shoulder in the recessed portion of said stem before said retainer can be moved laterally for assembly or disassembly of said retainer member.

2. A valve spring retainer adapted for seating on a valve stem having a reduced diameter portion adjacent the tip end of the valve stem providing an abutment shoulder disposed on a radial plane which comprises a sheet metal form member of uniform thickness having an outturned radial outer peripheral flange, an inturned inner peripheral flange disposed in a radial plane and in offset axial spaced relation from said outer flange, and a neck interconnecting the inner and outer flanges, said inner flange and said neck having a keyhole opening formed therein, said keyhole opening having a small end in said inner flange sized to embrace the reduced diameter portion of the valve stem but being too small to receive the abutment shoulder, whereby said inner flange will engage said abutment shoulder, said keyhole opening having a large end lying in said neck and being sized to freely receive the valve stem, a portion of said neck being sized to abut said valve stem adjacent said abutment shoulder and a portion of said keyhole opening in said neck portion being sized to prevent lateral shifting of said retainer relative to said valve stem when said inner flange is against said abutment shoulder, said neck accommodating lateral shifting of said retainer to a removing position when said inner flange is spaced from said abutment shoulder by movement of said portion of said neck into said reduced portion of the valve stem.

References Cited in the file of this patent

UNITED STATES PATENTS

| | | |
|---|---|---|
| 972,434 | Blomberg | Oct. 11, 1910 |
| 1,193,738 | Thoms | Aug. 8, 1916 |
| 1,775,069 | Finney | Sept. 2, 1930 |
| 2,523,570 | Holdsworth | Sept. 26, 1950 |
| 2,647,501 | Rich | Aug. 4, 1953 |
| 2,707,462 | Kirkpatrick | May 3, 1955 |
| 2,844,134 | Sietman | July 22, 1958 |
| 2,847,981 | Sampietro | Aug. 19, 1958 |